United States Patent
Liu et al.

(10) Patent No.: US 12,200,689 B2
(45) Date of Patent: Jan. 14, 2025

(54) METHODS AND DEVICES FOR SCHEDULING TRANSMISSION OF CONTROL INFORMATION

(71) Applicant: ZTE Corporation, Shenzhen (CN)

(72) Inventors: Xing Liu, Shenzhen (CN); Peng Hao, Shenzhen (CN); Xianghui Han, Shenzhen (CN); Wei Gou, Shenzhen (CN); Jian Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 501 days.

(21) Appl. No.: 17/484,032

(22) Filed: Sep. 24, 2021

(65) Prior Publication Data

US 2022/0015121 A1    Jan. 13, 2022

Related U.S. Application Data

(63) Continuation of application No. PCT/CN2019/080259, filed on Mar. 28, 2019.

(51) Int. Cl.
*H04W 72/1268* (2023.01)
*H04W 72/21* (2023.01)

(52) U.S. Cl.
CPC ....... *H04W 72/1268* (2013.01); *H04W 72/21* (2023.01)

(58) Field of Classification Search
CPC .......................... H04W 72/1268; H04W 72/21
(Continued)

(56) References Cited

U.S. PATENT DOCUMENTS

2013/0208710 A1* 8/2013 Seo ............. H04W 72/21
370/336
2018/0167933 A1* 6/2018 Yin ............. H04L 5/0053
(Continued)

FOREIGN PATENT DOCUMENTS

CN    107241805 A    10/2017
CN    109391388 A    2/2019
(Continued)

OTHER PUBLICATIONS

Chinese Office Action with English translation regarding Application No. 201980094833X dated May 8, 2023.
(Continued)

*Primary Examiner* — Chi Tang P Cheng
(74) *Attorney, Agent, or Firm* — Crowell & Moring LLP (57) ABSTRACT

This disclosure relates to methods and devices for scheduling transmission of control information in wireless communication systems. In one implementation, the method includes receiving, by a wireless network node, a first scheduling request for a radio channel to transmit a first set of information. The method may also include scheduling, by the wireless network node, a first radio channel during a first time slot as a first shared channel for transmitting the first set of information in response to the first scheduling request, the first shared channel being shared by control information and the first set of information. The method may further include detecting, by the wireless network node, a conflict related to the first shared channel, and resolving, by the wireless network node, the conflict related to the first shared channel.

14 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0230683 | A1* | 7/2019 | Akkarakaran | .... H04W 72/1268 |
| 2021/0160901 | A1 | 5/2021 | Takeda et al. | |
| 2022/0095335 | A1* | 3/2022 | Gao | ....................... H04L 5/0062 |

FOREIGN PATENT DOCUMENTS

| | | |
|---|---|---|
| CN | 109392168 A | 2/2019 |
| CN | 109391388 B | 1/2021 |
| WO | WO2012092815 A1 | 7/2012 |
| WO | WO 2019/016951 A1 | 1/2019 |

OTHER PUBLICATIONS

Vivo, "Remaining issues on PUCCH," 3GPP TSG RAN WG1, Meeting #94bis R1-1810370, Oct. 12, 2018.
Second Chinese Office Action with English translation regarding Application No. 201980094833X dated Oct. 9, 2023.
Extended European Search Report regarding EP 19 92 0964 dated Feb. 24, 2022.
OPPO: "Discussions on intra-UE multiplexing scenarios", 3GPP Draft; RI-1902422, 3rd Generation Partnership Project (3GPP), Mobile Competence Centre; 650, Route Des Lucioles; F-06921 Sophia Antipolis Cedex; France vol. RAN WGI, No. Athens, Greece; Feb. 25, 2019-Mar. 1, 2019 Feb. 15, 2019, pp. 1-6, XP051600118, Retrieved from the Internet: URL:http://www.3gpp.org/ftp/tsg%5Fran/WG1%5FRL1/TSGR1%5F96/Docs/RI%2DI902422%2Ezip.
Intel Corporation: "Handling UL transmissions with different reliability requirements", 3GPP Draft; RI-1804742 Intel—UL MUX, $3^{rd}$ Generation Partnership Project (3GPP), Mobile Competence Centre; 650, Route Des Lucioles; F-06921 Sophia-Antipolis Cedex; France. vol. RAN WGI, no. Sanya, PR. China; Apr. 16, 2018-Apr. 20, 2018, Apr. 15, 2018, XP051427009, Retrieved from the Internet: URL:http://www.3gpp.org/ftp/Meetings%5F3GPP%5FSYNC/RAN1/Docs/.
Sony: "Considerations on UL Intra-UE Tx Multiplexing," 3GPP Draft; RI-1902182—REL-16 URLLC—Intra-UE MUX V00, 3rd Generation Partnership Project (3GPP), Mobile Competence Centre; 650, Route Des Lucioles; F-06921 Sophia-Antipolis Cedex; France, vol. RAN WGI, No. Athens, Greece; Feb. 25, 2019-Mar. 1, 2019, Feb. 16, 2019, XP051599877, Retrieved from the Internet: URL:http://www.3gpp.org/ftp/tsg%5Fran/WG1%5FRL1/TSGR1%5F96/Docs/RI%2DI902182%2Ezip.
International Search Report and Written Opinion regarding PCT/CN2019/080259 dated Dec. 27, 2019.
European Search Report regarding Application No. 19 920 964.4 dated Apr. 19, 2024, 8 pages.
Sony, "Considerations on UL pre-emption," 3GPP Draft; R1-1804600—REL-15 NR—UL Pre-Emption V02, $3^{rd}$ Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 15, 2018, XP051426869, 8 pages, Retrieved from the Internet: http://www.3gpp.org/ftp/Meetings%5F3G PP%5FSYNC/RAN 1 /Docs/.
Ericsson, "Physical Layer Enhancements for Intra-UE Prioritization and Multiplexing," 3GPP Draft; R1-1901601, Physical Layer Enhancements for Intra-UE Prioritization and Multiplexing, 3rd Generation Partnership Project (3GPP), Mobile Competence Centre, 650, Route Des Lucioles, F-06921, vol. RAN WG1, No. Athens, Greece, Feb. 25, 2019-Mar. 1, 2019, Feb. 16, 2019, XP051599298, 6 pages, Retrieved from the Internet: URL:http://www.3gpp.org/ftp/tsg%5Fran/WG1 %5FRL 1 /TSGR1 %5F96/ Docs/R1%2D1901601 %2Ezip.
Indonesian Office Action and Substantive Examination Report regarding Application No. P00202107824 dated Jun. 21, 2024, 6 gages.

* cited by examiner

```
canceling, by the wireless network node, the first shared channel scheduled for the
first scheduling request
                                                                                    410
```

↓

```
scheduling, by the wireless network node, a second radio channel at a second time
slot as a second shared channel for transmitting the first set of information and the
control information
                                                                                    420
```

600 canceling, by the wireless network node, the first shared channel scheduled for the first scheduling request
610 scheduling, by the wireless network node, a second radio channel at a second time slot as a second shared channel for transmitting the first set of information
620 determining, by the wireless network node, whether a control channel during the first time slot is available for transmitting the control information
630 in response to the determination that the control channel during the first time slot is available for transmitting the control information, receiving, by the wireless network node, the control information in the control channel during the first time slot
640

```
canceling, by the wireless network node, the first shared channel scheduled for the
first scheduling request
                                                                              810
```

```
scheduling, by the wireless network node, a second radio channel during a second
time slot as a second shared channel for transmitting the first set of information
                                                                              820
```

```
receiving, by the wireless network node, the control information in the first radio
channel during the first time slot
                                                                              830
```

METHODS AND DEVICES FOR SCHEDULING TRANSMISSION OF CONTROL INFORMATION

CROSS-REFERENCE TO RELATED APPLICATION

This application is a continuation application of PCT International Patent Application No. PCT/CN2019/080259, filed with the China National Intellectual Property Administration, PRC on Mar. 28, 2019, which is herein incorporated by reference in its entirety.

TECHNICAL FIELD

This disclosure is directed generally to wireless communications.

BACKGROUND

Wireless communication technologies are moving the world toward an increasingly connected and networked society. The rapid growth of mobile communications and advances in technology has led to greater demand for network capacity and connectivity. Other aspects, such as energy consumption, device cost, spectral efficiency, and latency are also important to meeting the needs of various communication scenarios. In comparison with the existing wireless access networks, next generation systems and wireless communication techniques need to support much broader coverage and much higher number of connections.

SUMMARY

This disclosure is directed to methods, systems, and devices related to wireless communication, and more specifically, for scheduling a transmission of control information in response to a conflict in a previously shared channel for transmitting the control information.

In one embodiment, the disclosure describes a method for wireless communication. The method may include receiving, by a wireless network node, a first scheduling request for a radio channel to transmit a first set of information. The method may include scheduling, by the wireless network node, a first radio channel during a first time slot as a first shared channel for transmitting the first set of information in response to the first scheduling request, the first shared channel being shared by control information and the first set of information. The method may further include detecting, by the wireless network node, a conflict related to the first shared channel, and resolving, by the wireless network node, the conflict related to the first shared channel.

In another embodiment, the disclosure describes another method for wireless communication. The method may include sending, by a user equipment (UE), a first scheduling request to a wireless network node. The method may also include receiving, by the UE, a scheduling information comprising a first radio channel during a first time slot as a first shared channel for transmitting the first set of information, the first shared channel being shared by control information and the first set of information. The method may further include transmitting, by the UE, the control information in a third radio channel in response to detecting a conflict related to the first shared channel.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Throughout the disclosure and claims, terms may have nuanced meanings suggested or implied in context beyond an explicitly stated meaning. Likewise, the phrase "in one embodiment/implementation" or "in some embodiments/implementations" as used herein does not necessarily refer to the same embodiment/implementation and the phrase "in another embodiment/implementation" or "in other embodiments/implementations" as used herein does not necessarily refer to a different embodiment/implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean 1) A, B, and C, here used in the inclusive sense; and 2) A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and apparatus for scheduling transmission of control information. The present disclosure addressed the issues with a scheduling conflict related to a shared channel, when the shared channel is scheduled to transmit the control information. The methods and devices described in the present disclosure may facilitate the transmission of the control information, so that the effect upon the transmission of the control information from cancellation or re-schedule of the shared channel is greatly reduced. The methods and devices described in the present disclosure may also help reducing the un-necessary re-transmission in the shared channel. The methods and devices described in the present disclosure may improves the overall efficiency of wireless communication systems.

In wireless communication systems, a wireless network node may wirelessly communicate with one or more user equipment (UE). In one implementation, the wireless network node may be a base station, including but not limited to, a 5G base station (gNB). In another implementation, the UE may be a wireless terminal, including but not limited to a mobile phone terminal, a tablet computer, and a smart electronics or appliance including an air conditioner, a television, a refrigerator, an oven and the like.

Figure 1:
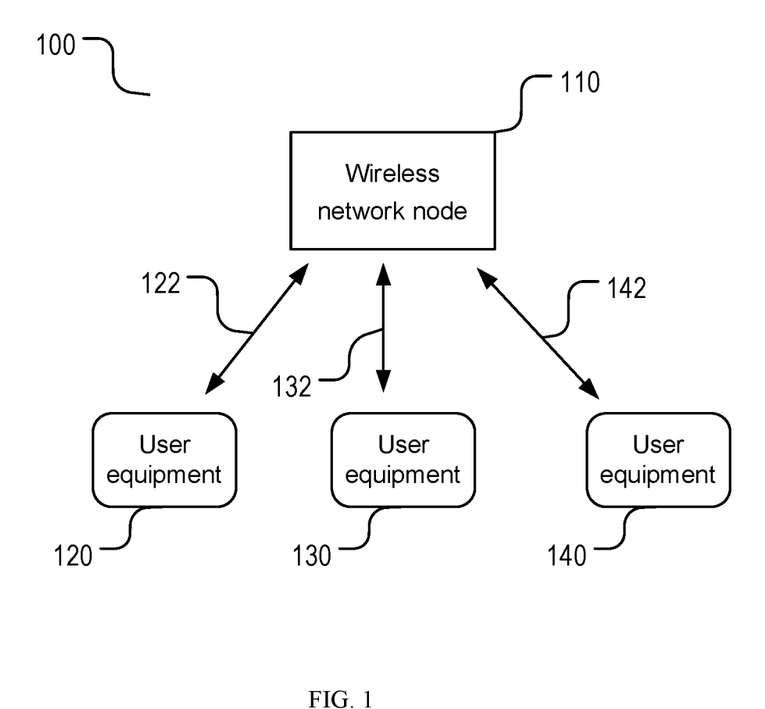
FIG. 1 shows an example of a wireless communication system include a wireless network node and a plurality of user equipment.

FIG. 1 shows a wireless communication system 100 including a wireless network node 110 and one or more UE (120, 130, and 140). The number of UE in the wireless communication system 100 may be smaller or much larger than three, for example, 100, 1000, 10000, or 100000.

The UE 120 may wirelessly communicate with the first wireless network node 110 via a first channel 122 including a plurality of radio channels during a certain period of time. Likewise, the second UE 130 may wirelessly communicate with the wireless network node 110 via a second channel 132 including a plurality of radio channels during a certain period of time, and the third UE 140 may wirelessly communicate with the wireless network node 110 via a third channel 142 including a plurality of radio channels during a certain period of time.

In one implementation, the first channel 122 and the second channel 132 may entirely or partially overlap in radio frequency domain. In another implementation, the first channel 122 and the second channel may entirely or partially overlap in time domain.

In wireless communication systems, a UE may send control information to a wireless network node in a control channel, which may be normally designated for transmitting the control information. The control channel may overlap with a shared channel in time domain. In response to the situation where the control channel overlaps with the shared channel in time domain, the wireless network node may resolve this overlapping issue by scheduling a portion of the shared channel to transmit the control information. Thus, the UE may send the control information to the wireless network node via the shared channel, minimizing the situation in which the UE transmit information via both the control channel and the shared channel at the same time. The shared channel may be shared by the control information with other information that is scheduled to transmit on the shared channel.

In one implementation, the UE may normally use a physical uplink control channel (PUCCH) to transmit uplink control information (UCI) to the wireless network node. The wireless network node may schedule a physical uplink shared channel (PUSCH) for the UE to transmit other information. When the PUCCH overlaps with the PUSCH in time domain, a portion of the PUSCH will be used to carry UCI according to a predefined rule, and the PUCCH may be canceled or removed. The predefined rule can include a rule to be specified in the specification or decided by the wireless network node and indicated to the UE. Thus, the UE may send the control information to the wireless network node via the shared channel and minimize the situation in which the UE transmit information via both the control channel and the shared channel at the same time. The UCI may include one of hybrid automatic repeat request (HARQ) acknowledge feedback information, scheduling request information, channel state information (CSI) and the like.

In another implementation, UCI and PUSCH may be coded independently. After UCI is coded, the coded UCI may be mapped to the shared channel according to a pre-determined protocol.

Figure 2:
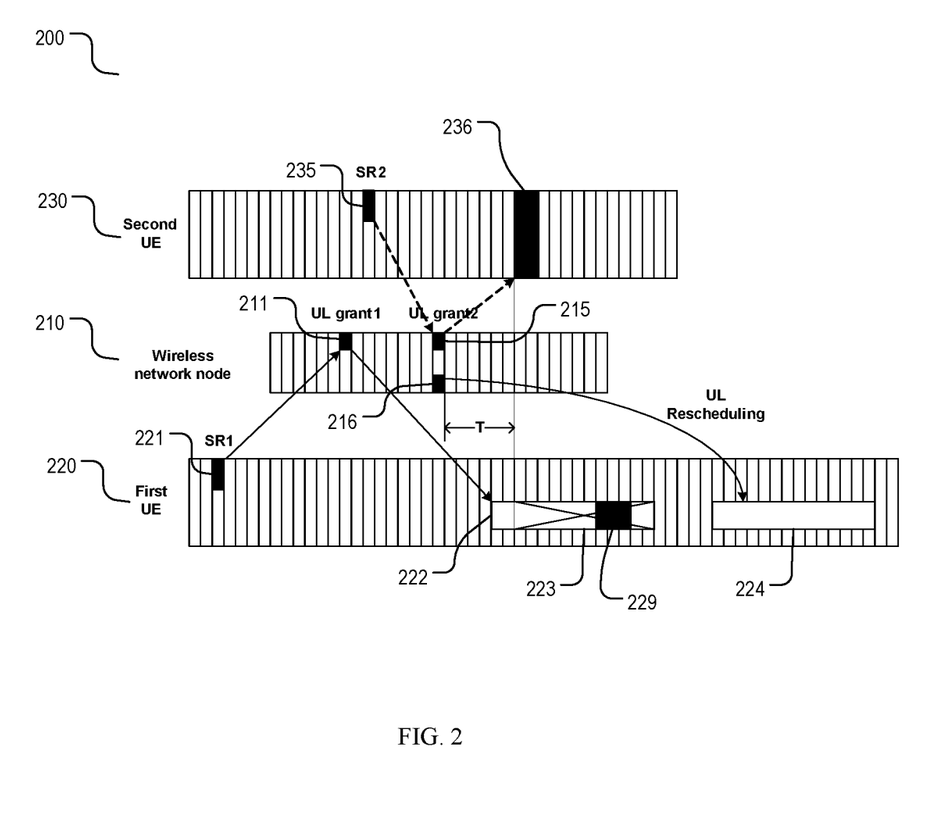
FIG. 2 shows an example of a conflict related to a shared channel scheduled to transmit control information.

The present disclosure describes solutions to resolve a scheduling conflict to the shared channel that is scheduled for the UE to transmit control information. FIG. 2 shows a scheduling conflict 200 in a shared channel 222 that is scheduled for a first UE 220 to transmit control information 229. FIG. 2 further shows timing diagram of the operation of various steps in FIG. 3.

Figure 3:
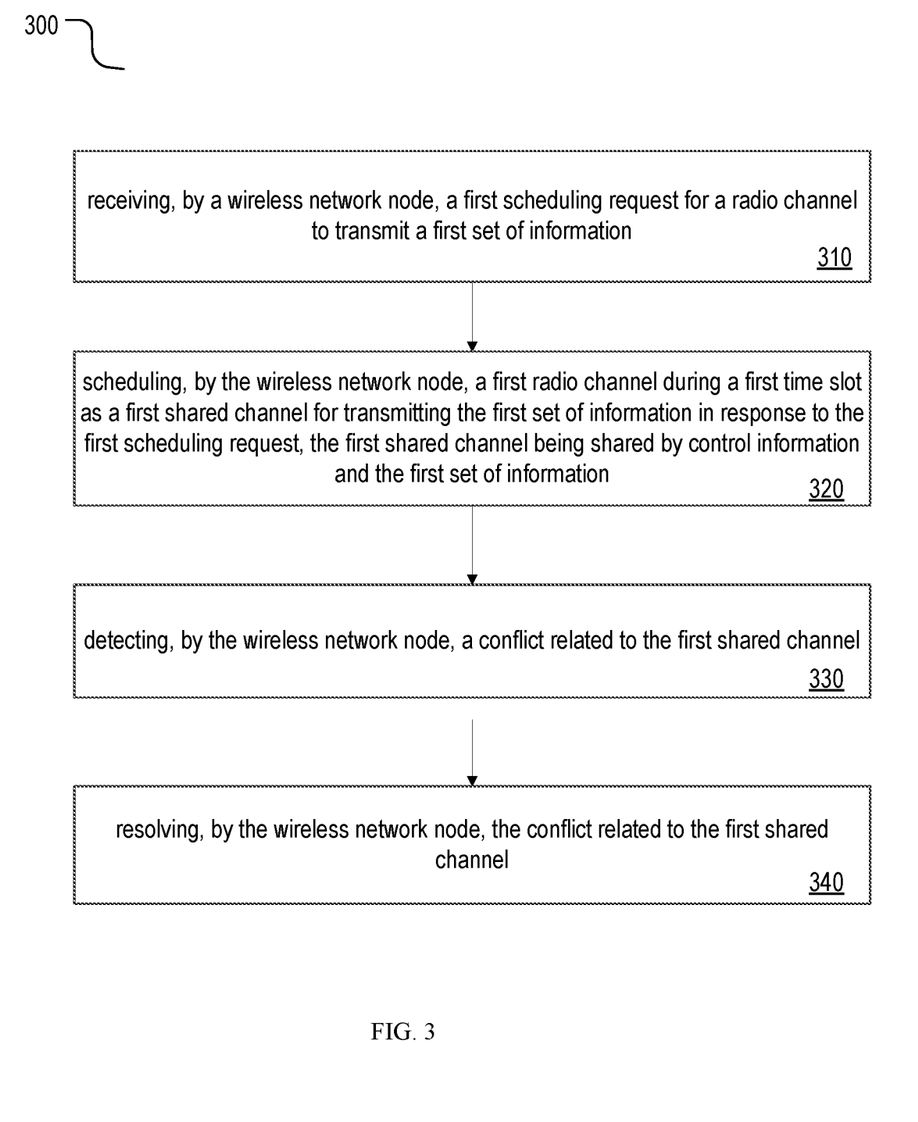
FIG. 3 shows a flow diagram of a method for wireless communication.

The present disclosure describes a method for wireless communication 300, as shown in the logic flow of FIG. 3. The method 300 may include step 310: receiving, by a wireless network node, a first scheduling request for a radio channel to transmit a first set of information; step 320: scheduling, by the wireless network node, a first radio channel during a first time slot as a first shared channel for transmitting the first set of information in response to the first scheduling request, the first shared channel being shared by control information and the first set of information; step 330: detecting, by the wireless network node, a conflict related to the first shared channel; and step 340: resolving, by the wireless network node, the conflict related to the first shared channel.

The operation of various steps in FIG. 3 is described in more detail below by referring to the timing diagram of FIG. 2.

In step 310, the wireless network node may receive a first scheduling request for a radio channel to transmit a first set of information.

Referring to FIG. 2, the first UE 220 may send the first scheduling request (SR1, 221) to the wireless network node 210. The SR1 may include a request for a radio channel to transmit a first set of information.

In step 320 of FIG. 3, the wireless network node may schedule a first radio channel during a first time slot as a first shared channel for transmitting the first set of information in response to the first scheduling request, the first shared channel being shared by control information and the first set of information.

Referring to FIG. 2, in response to the SR1, the wireless network node may create a first uplink grant (UL grant1, 211) to schedule the first shared channel 222 for the first UE to transmit the first set of information. The first shared channel 222 may be a PUSCH and may include a first radio channel during a first time slot. The first shared channel 222 may be shared by control information 229 and the first set of information.

In step 330 of FIG. 3, the wireless network node may detect a conflict related to the first shared channel. In one implementation as shown in FIG. 2, a second UE 230 may send a second scheduling request (SR2, 235) to the wireless network node 210. The SR2 may include a request for a radio channel to transmit a second set of information. The wireless network node 210 may create a second uplink grant (UL grant2, 215) to schedule a second channel 236 for the second UE to transmit the second set of information as early as possible in time domain. Thus, the wireless network node 210 may cancel all or a portion of the first shared channel 223 and schedule the recourse for the second UE to transmit the second set of information. For example, the second set of information may have a higher priority than the first set of information; the second UE may have a higher priority than the first UE; and/or that the second set of information may include information requiring low latency and/or high reliability. Therefore, the wireless network node 210 detect this conflict related to the first shared channel.

Thus, as shown in FIG. 2, the wireless network node 210 may cancel the portion 223 of the first shared channel that was scheduled for the first UE, and schedule the second channel 236. For example, the cancellation may be indicated to start at time T after UL grant2 215, and the second channel 236 may also be scheduled to start at time T after UL grant2 215.

Referring to FIG. 2, in response to the cancellation of all or a portion of the first shared channel 222, the wireless network node 210 may create another UL grant 216 to schedule a re-scheduled first shared channel 224 for the first UE to transmit the first set of information. The UL grant 216 may include a same HARQ process identification (ID) as the UL grant1 211 and a new data indicator (NDI). The wireless network node may invert the NDI of the UL grant 216, indicating this uplink grant is corresponding to a scheduling request that had been previously scheduled. The re-scheduled first shared channel 224 and the first shared channel 222 may include same radio channels or different radio channels. The re-scheduled first shared channel 224 and the first shared channel 222 may include same or different durations in time domain, corresponding to all of the first shared channel 222 or only a canceled portion of the first shared channel.

Not limited to the situation shown in FIG. 2, the wireless network node 210 may detect a conflict related to the first shared channel, and thus may cancel and/or re-schedule the first shared channel due to many other reasons. For one example, the reasons may include a reason that the first shared channel may have a scheduling conflict with a frame structure configuration.

In another implementation, the reasons may include a constraint of power of the UE. For example, the UE may have a limitation on the total power consumption rate so that the UE may not transmit the first set of information with the first shared channel at the scheduled time slot. For another example, the UE may be configured to be in a low power state and thus, the transmission of the first set of information may be delayed or canceled.

In step 340 of FIG. 3, the wireless network node may resolve the conflict related to the first shared channel. Below, the present disclosure describes several example embodiments for resolving the scheduling conflict to the shared channel that is scheduled for the UE to transmit control information.

First Embodiment

Figure 4:
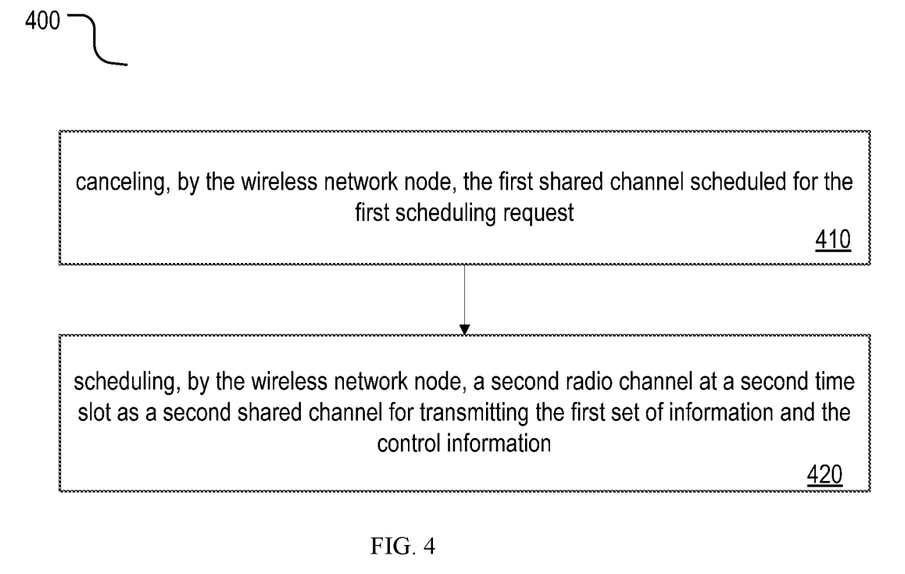
FIG. 4 shows a flow diagram of one embodiment for resolving a conflict related to a shared channel.

The present disclosure describes one embodiment 400 in FIG. 4 to resolve a scheduling conflict to a first shared channel that carries control information of a first UE. In this embodiment, the wireless network node may cancel the first shared channel, schedule a second shared channel for the first UE to transmit the control information.

As shown in FIG. 4, the method 400 for wireless communication includes step 410: canceling, by the wireless network node, the first shared channel scheduled for the first scheduling request; and step 420: scheduling, by the wireless network node, a second radio channel at a second time slot as a second shared channel for transmitting the first set of information and the control information.

The operation of various steps in FIG. 4 is described in more detail below by referring to the timing diagram of FIG. 5.

In step 410 of FIG. 4, the wireless network node may cancel the first shared channel scheduled for the first scheduling request.

Figure 5:
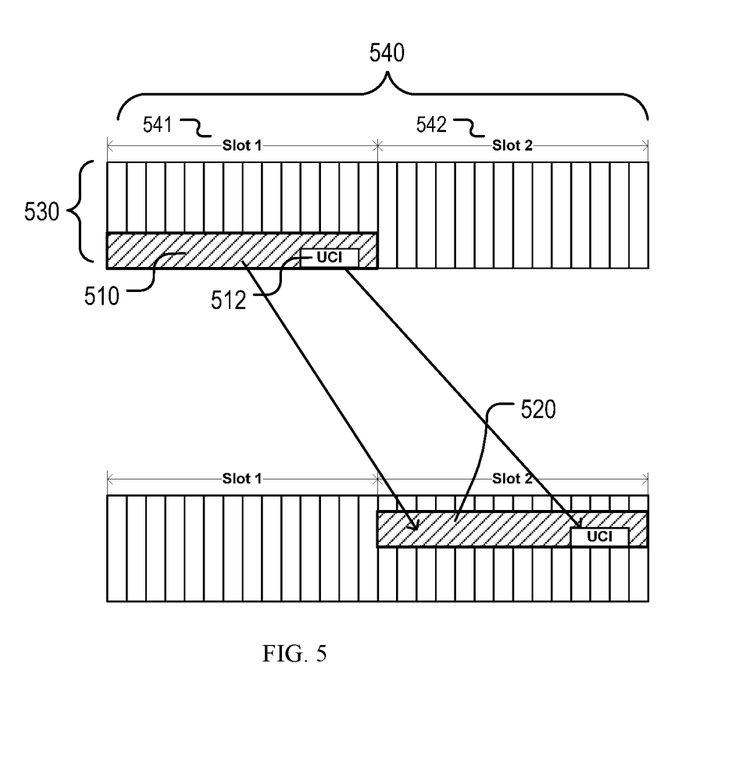
FIG. 5 shows a schematic diagram of one embodiment for resolving a conflict related to a shared channel.

In FIG. 5, the wireless network node has scheduled the first shared channel 510 for the first UE to transmit the first set of information and the control information 512. The first shared channel 510 may include a first radio channel among a plurality of radio channels 530 during a first time slot 541 among a plurality of time slots 540. The first shared channel 510 may include a physical uplink shared channel (PUSCH). The control information 512 may include uplink control information (UCI).

The wireless network node may cancel the first shared channel to free up the resource related to the first radio channel during the first time slot, thus resolving the conflict related to the first shared channel.

In step 420 of FIG. 4, the wireless network node may schedule a second radio channel at a second time slot as a second shared channel 520 for transmitting the first set of information and the control information 512, as shown in FIG. 5. The position of control information in the second shared channel 520 may be determined based on a pre-determined protocol, for example, resource elements (REs) mapped by UCI can be calculated basing on the indication of the last downlink control information (DCI) of the first UE.

The second time slot may be no earlier than the first time slot. For example, in one implementation, the second time slot may be a later time 542 than the first time slot, as shown in FIG. 5; and in another implementation, the second time slot may be the same slot as the first time slot (not shown).

The second radio channel may be a same or different radio channel compared to the first time slot, i.e. the second radio channel and the first radio channel occupies a same or different frequency resource. For example, in one implementation, the second radio channel may be a different radio channel compared with the first radio channel, as shown in FIG. 5; and in another implementation, the second radio channel may be the same radio channel as the first radio channel (not shown).

Second Embodiment

Figure 6:
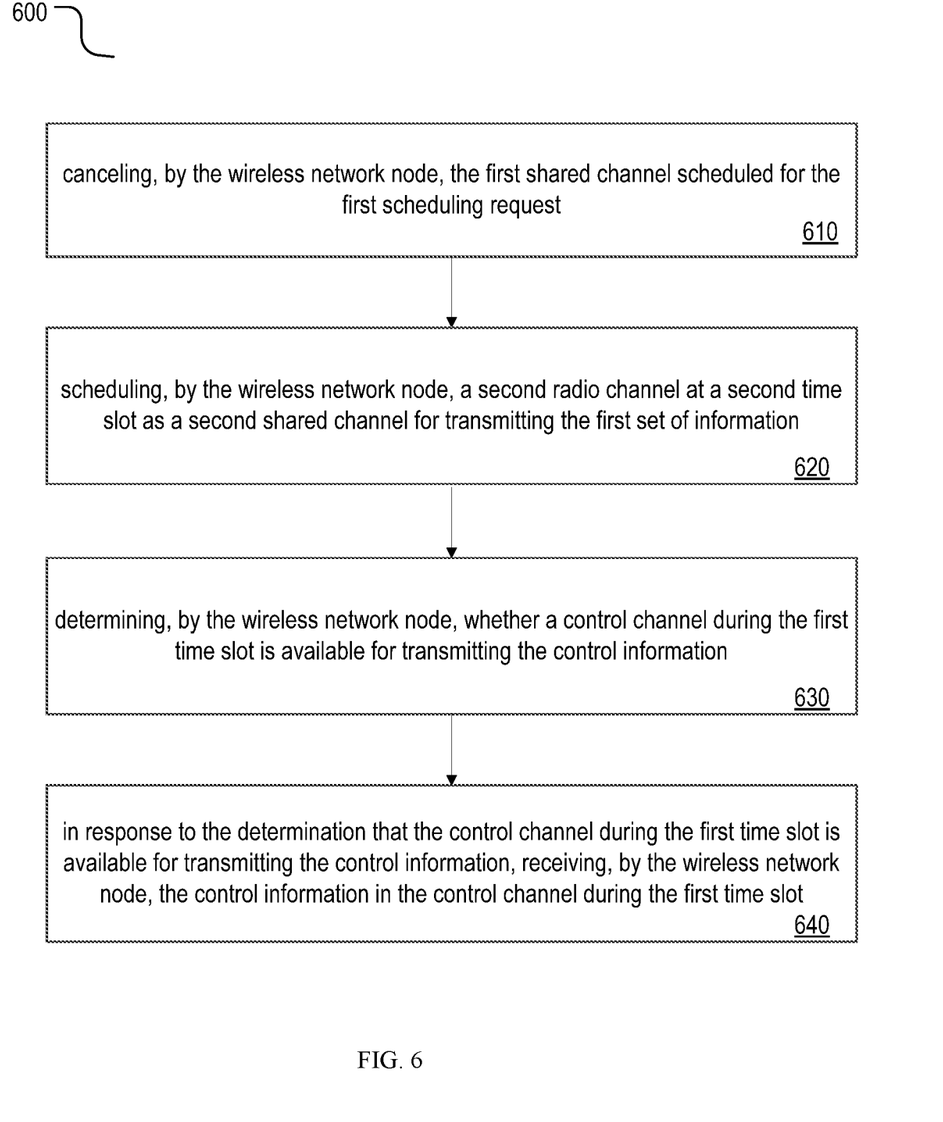
FIG. 6 shows a flow diagram of one embodiment for resolving a conflict related to a shared channel.

The present disclosure describes another embodiment 600 in FIG. 6 to resolve a scheduling conflict to a first shared channel that carries the control information of a first UE. In this embodiment, the wireless network node may cancel the first shared channel, determine whether a control channel is available for transmitting the control information, and in response to the determination that the control channel is available, schedule the control channel for transmitting the control information.

As shown in FIG. 6, the method 600 for wireless communication includes step 610: canceling, by the wireless network node, the first shared channel scheduled for the first scheduling request; step 620: scheduling, by the wireless network node, a second radio channel at a second time slot as a second shared channel for transmitting the first set of information; step 630: determining, by the wireless network node, whether a control channel during the first time slot is available for transmitting the control information; and step 640: in response to the determination that the control channel during the first time slot is available for transmitting the control information, receiving, by the wireless network node, the control information in the control channel during the first time slot.

The operation of various steps in FIG. 6 is described in more detail below by referring to the timing diagram of FIG. 7.

In step 610 of FIG. 6, the wireless network node may cancel the first shared channel. In FIG. 7, the wireless network node has scheduled the first shared channel 710 for the first UE to transmit the first set of information and the control information 712. The first shared channel 710 may include a first radio channel among a plurality of radio channels 730 during a first time slot 741 among a plurality of time slots 740. The first shared channel 710 may include a physical uplink shared channel (PUSCH). The control information 712 may include uplink control information (UCI). The wireless network node may cancel the first shared channel 710 to free up the resource related to the first radio channel during the first time slot, thus resolving the conflict related to the first shared channel.

Figure 7:
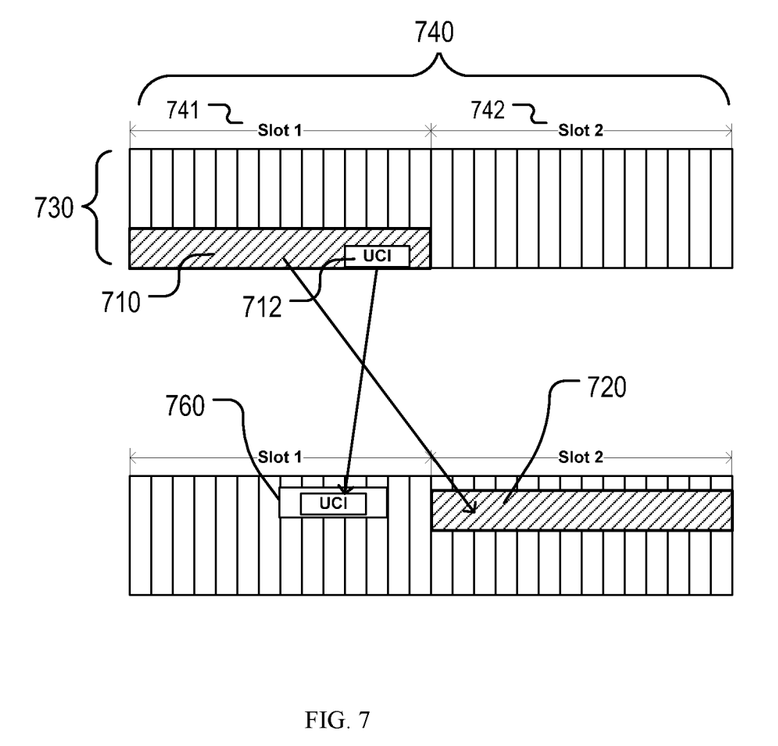
FIG. 7 shows a schematic diagram of one embodiment for resolving a conflict related to a shared channel.

In step 620 of FIG. 6, the wireless network node may schedule a second radio channel at a second time slot as a second shared channel 720 for transmitting the first set of information, as shown in FIG. 7. This step is optional in the embodiment. The wireless network node may determine not to transmit the first set of information, so that the wireless network node do not need to schedule the second shared channel 720 for transmitting the first set of information. The second shared channel 720 and the first shared channel may include same or different radio channels, and/or may include same or different time slots.

In step 630 of FIG. 6, the wireless network node may determine whether a control channel 760 during the first time slot is available for transmitting the control information. The control channel may include a physical uplink control channel (PUCCH). This step may further include determining, by the wireless network node, whether resource for the control channel during the first time slot scheduled for other transmission; and in response to the determination that resource for the control channel during the first time slot is not scheduled for other transmission, determining, by the wireless network node, that the control channel during the first time slot is available for transmitting the control information.

In step 640 of FIG. 6, in response to the determination that the control channel during the first time slot is available for transmitting the control information, the wireless network node may receive the control information in the control channel during the first time slot.

Third Embodiment

Figure 8:
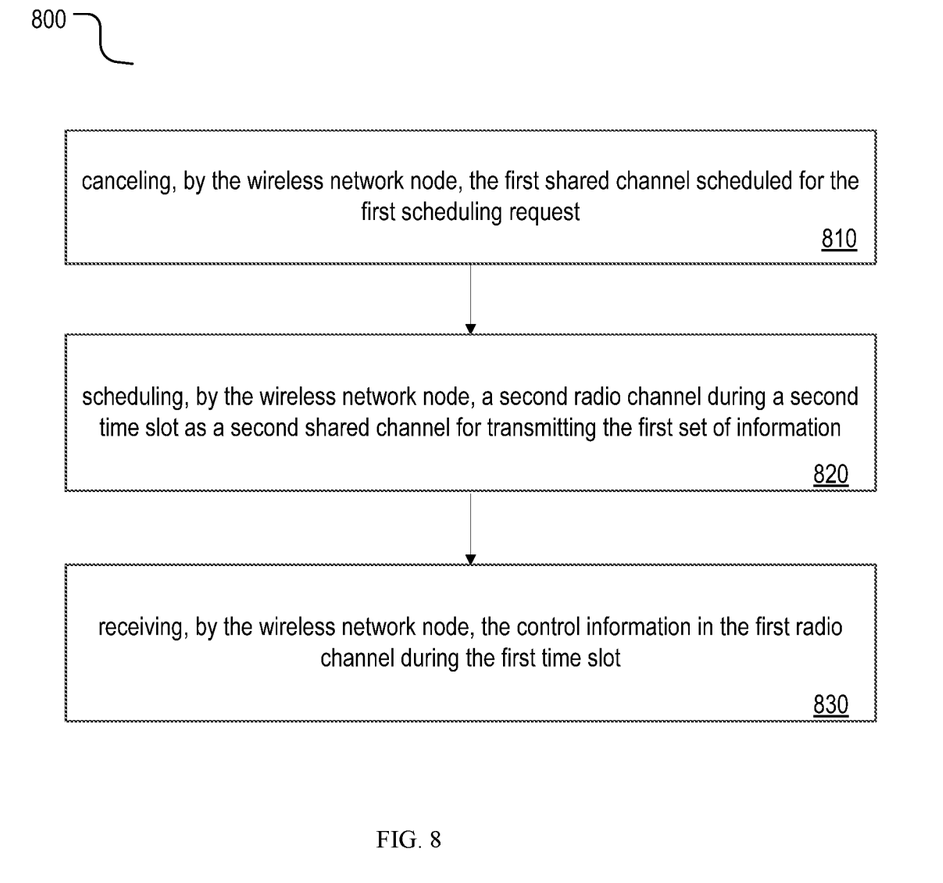
FIG. 8 shows a flow diagram of one embodiment for resolving a conflict related to a shared channel.

The present disclosure describes another embodiment 800 in FIG. 8 to resolve a scheduling conflict to a first shared channel that carries control information of a first UE. In this embodiment, the control information may have a higher priority so that the wireless network node may cancel the first shared channel but still maintain a portion of first radio channel during the first time slot for transmitting the control information. In another implementation, the control information may share the first radio channel during the first time slot with a second UE or a second set of information.

As shown in FIG. 8, the method 800 for wireless communication includes step 810: canceling, by the wireless network node, the first shared channel scheduled for the first scheduling request; step 820: scheduling, by the wireless network node, a second radio channel during a second time slot as a second shared channel for transmitting the first set of information; and step 830: receiving, by the wireless network node, the control information in the first radio channel during the first time slot.

The operation of various steps in FIG. 8 is described in more detail below by referring to the timing diagram of FIG. 9.

In step 810 of FIG. 8, the wireless network node may cancel the first shared channel scheduled for transmitting the first set of information. In FIG. 9, the wireless network node has scheduled the first shared channel 910 for the first UE to transmit the first set of information and the control information 912. The first shared channel 910 may include a first radio channel among a plurality of radio channels 930 during a first time slot 941 among a plurality of time slots 940. The first shared channel 910 may include a physical uplink shared channel (PUSCH). The control information 912 may include uplink control information (UCI). The wireless network node may cancel a portion of the first shared channel 910 for transmitting the first set of information to free up the resource related to the canceled portion of the first radio channel during the first time slot to resolve the conflict related to the first shared channel. The wireless network node may determine to keep the schedule of a portion of the first radio channel during the first time slot for transmitting the control information for various reasons, for example, the control information including information with high priority.

Figure 9:
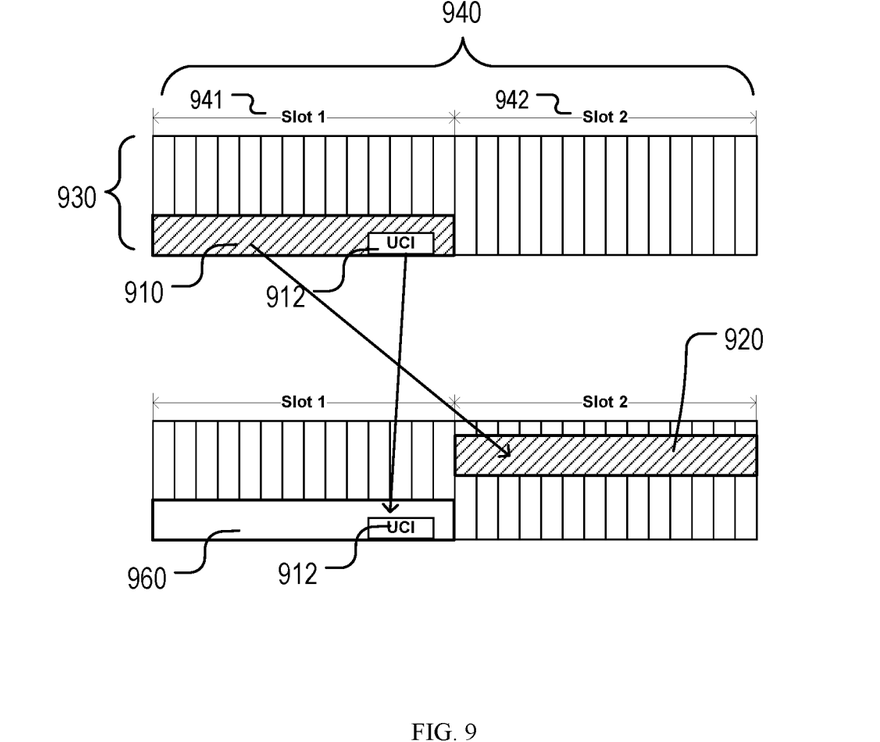
FIG. 9 shows a schematic diagram of one embodiment for resolving a conflict related to a shared channel.

In step 820 of FIG. 8, the wireless network node may schedule a second radio channel during a second time slot as a second shared channel 920 for transmitting the first set of information, as shown in FIG. 9. This step may be optional in the embodiment. The wireless network node may determine not to transmit the first set of information, so that the wireless network node do not need to schedule the second shared channel 920 for transmitting the first set of information. The second shared channel 920 and the first shared channel may include the same or different radio channels, and/or may include the same or different time slots.

In step 830 of FIG. 8, the wireless network node may receive the control information in the first radio channel during the first time slot. In one implementation, the wireless network node may schedule a new channel 960 including the first radio channel during the first time slot for transmitting the control information 912 and other set of information.

Fourth Embodiment

Figure 10:
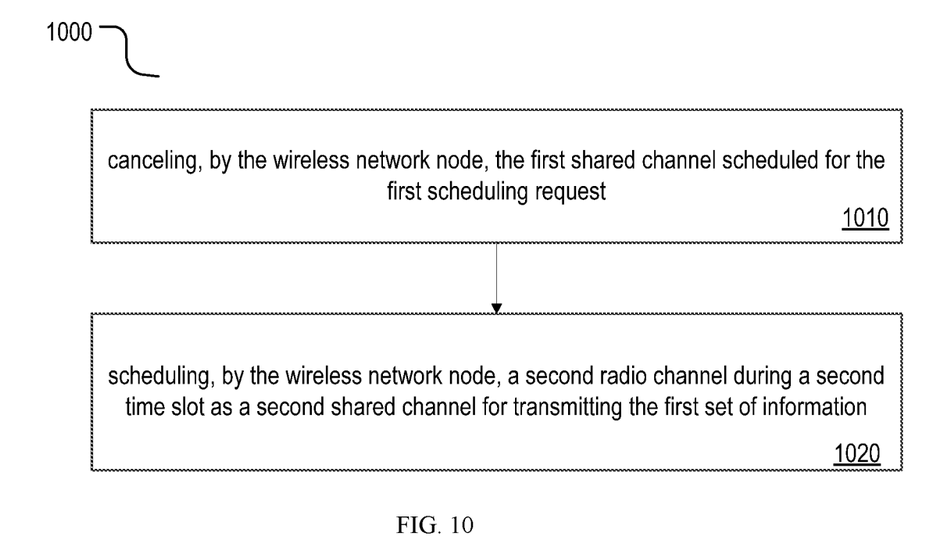
FIG. 10 shows a flow diagram of one embodiment for resolving a conflict related to a shared channel.

The present disclosure describes another embodiment 1000 in FIG. 10 to resolve a scheduling conflict to a first shared channel that carries control information of a first UE. In this embodiment, the wireless network node may cancel the first shared channel for transmitting the first set of information and control information, and optionally, may schedule a second shared channel for transmitting the first set of information. For example, the control information may not be transmitted from the first UE to the wireless network node.

As shown in FIG. 10, the method 1000 for wireless communication includes step 1010: canceling, by the wireless network node, the first shared channel scheduled for the first scheduling request; and step 1020: scheduling, by the wireless network node, a second radio channel during a second time slot as a second shared channel for transmitting the first set of information.

Figure 11:
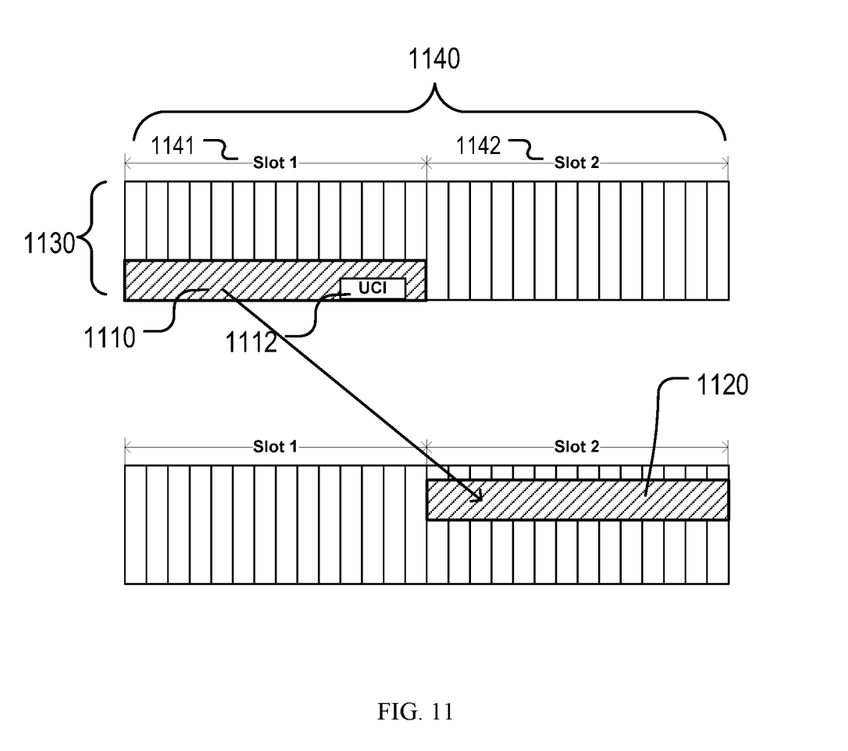
FIG. 11 shows a schematic diagram of one embodiment for resolving a conflict related to a shared channel.

The operation of various steps in FIG. 10 is described in more detail below by referring to the timing diagram of FIG. 11.

In step 1010 of FIG. 10, the wireless network node may cancel the first shared channel scheduled for the first scheduling request. In FIG. 11, the wireless network node has scheduled the first shared channel 1110 for the first UE to transmit the first set of information and the control information 1112. The first shared channel 1110 may include a first radio channel among a plurality of radio channels 1130 during a first time slot 1141 among a plurality of time slots 1140. The first shared channel 1110 may include a physical uplink shared channel (PUSCH). The control information 1112 may include uplink control information (UCI). The wireless network node may determine not to schedule for transmitting the control information, so that the wireless network node may cancel the first shared channel 1110 to free up the resource related to the first radio channel during the first time slot to resolve the conflict related to the first shared channel.

In step 1020 of FIG. 10, the wireless network node may schedule a second radio channel during a second time slot as a second shared channel for transmitting the first set of information. This step may be optional in the embodiment. In one implementation, the wireless network node may determine not to transmit the first set of information, so that the wireless network node do not need to schedule the second shared channel 1120 for transmitting the first set of information. In another implementation, the second shared channel 1120 and the first shared channel 1110 may include the same or different radio channels, and/or may include the same or different time slots.

Fifth Embodiment

Figure 12:
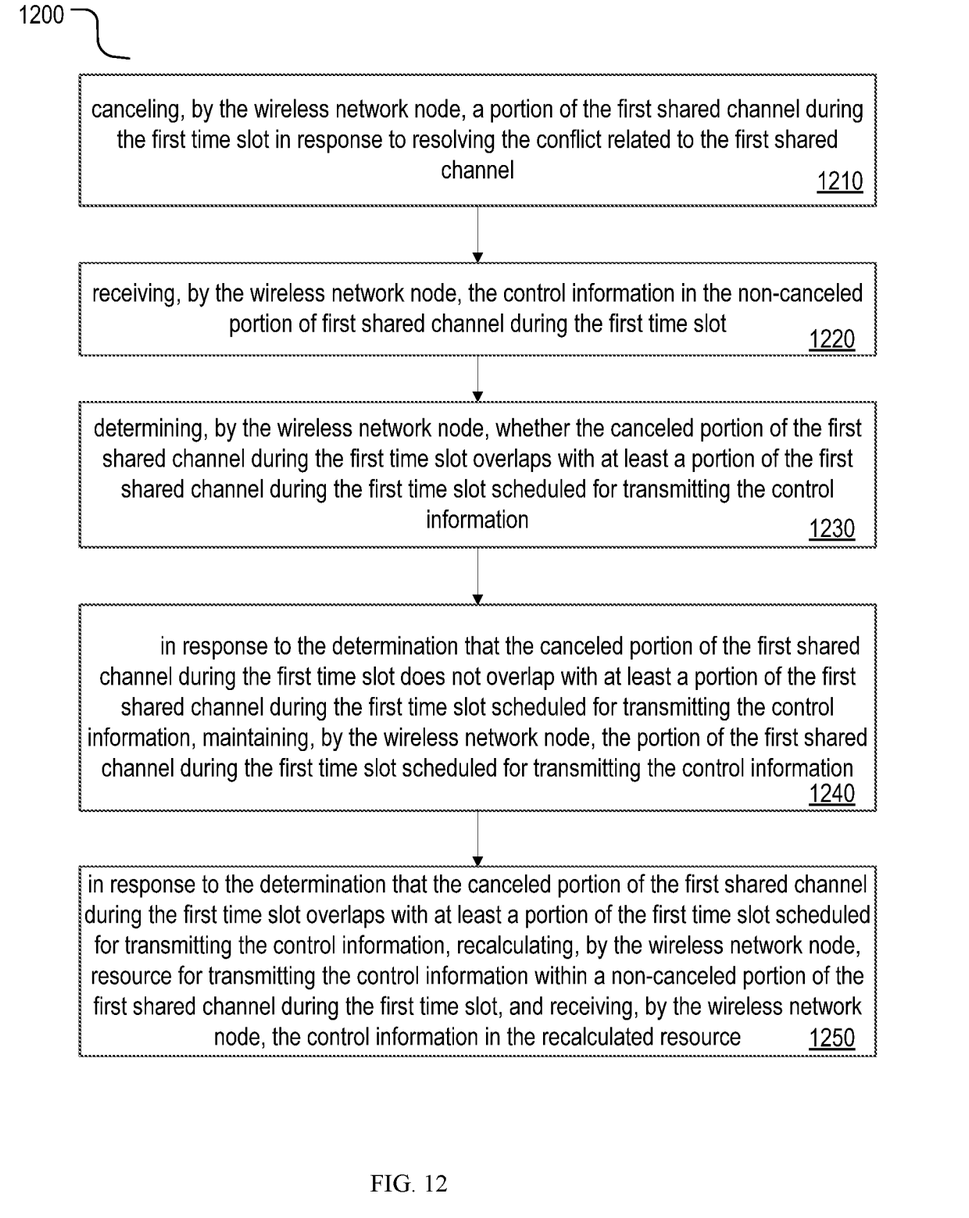
FIG. 12 shows a flow diagram of one embodiment for resolving a conflict related to a shared channel.

The present disclosure describes another embodiment 1200 in FIG. 12 to resolve a scheduling conflict to a first shared channel that carries control information of a first. In this embodiment, the wireless network node may cancel a portion of the first shared channel to resolve the conflict related to the first shared channel. Thus, the non-canceled portion of the first shared channel can be used for transmitting the control information.

As shown in FIG. 12, the method 1200 for wireless communication includes step 1210: canceling, by the wireless network node, a portion of the first shared channel during the first time slot in response to resolving the conflict related to the first shared channel; and step 1220: receiving, by the wireless network node, the control information in the non-canceled portion of first shared channel during the first time slot.

Figure 13:
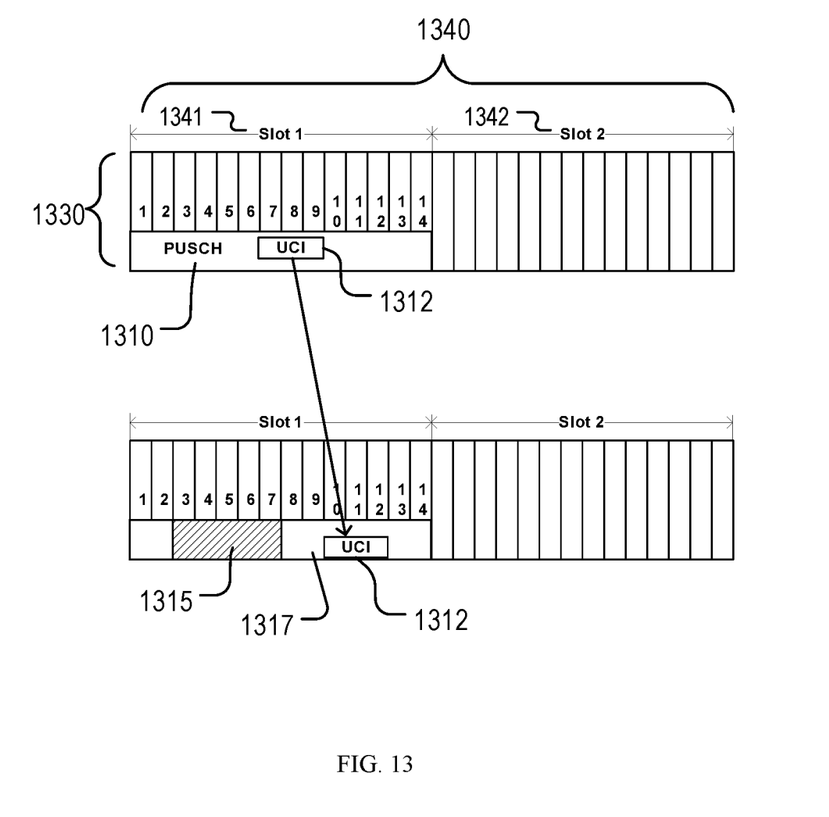
FIG. 13 shows a schematic diagram of one embodiment for resolving a conflict related to a shared channel.

The operation of various steps in FIG. 12 is described in more detail below by referring to the timing diagram of FIG. 13.

In step 1210 of FIG. 12, the wireless network node may cancel a portion of the first shared channel during the first time slot in response to resolving the conflict related to the first shared channel. In FIG. 13, the wireless network node has scheduled the first shared channel 1310 for the first UE to transmit the first set of information and the control information 1312. The first shared channel 1310 may include a first radio channel among a plurality of radio channels 1330 during a first time slot 1341 among a plurality of time slots 1340. The first shared channel 1310 may include a physical uplink shared channel (PUSCH). The control information 1312 may include uplink control information (UCI). The wireless network node may determine to cancel a portion 1315 of the first shared channel to resolve the conflict related to the first shared channel. For example, the wireless network node may cancel resource elements (RE) #3-7 as shown in FIG. 13.

In one implementation, the control information 1312 may still be transmitted via an un-cancelled portion 1317 of the first shared channel, so that in step 1220, the wireless network node may receive the control information in the non-canceled portion of first shared channel during the first time slot.

As shown in FIG. 12, the method 1200 may further include step 1230: determining, by the wireless network node, whether the canceled portion of the first shared channel during the first time slot overlaps with at least a portion of the first shared channel during the first time slot scheduled for transmitting the control information; step 1240: in response to the determination that the canceled portion of the first shared channel during the first time slot does not overlap with at least a portion of the first shared channel during the first time slot scheduled for transmitting the control information, maintaining, by the wireless network node, the portion of the first shared channel during the first time slot scheduled for transmitting the control information; and step 1250: in response to the determination that the canceled portion of the first shared channel during the first time slot overlaps with at least a portion of the first time slot scheduled for transmitting the control information, recalculating, by the wireless network node, resource for transmitting the control information within a non-canceled portion of the first shared channel during the first time slot, receiving, by the wireless network node, the control information in the recalculated resource.

In step 1230 of FIG. 12, the wireless network node may determine whether the canceled portion of the first shared channel during the first time slot overlaps with at least a portion of the first shared channel during the first time slot scheduled for transmitting the control information. For example as shown in FIG. 13, the cancelled portion of the first shared channel may include RE #3-7, and the control information may be originally scheduled at RE #7-9. Therefore, the wireless network node may determine that the canceled portion of the first shared channel overlaps with the control information, and then the method may proceed to step 1250. For another example (not shown), a cancelled portion of the first shared channel may include RE #3-7, and the control information may be originally scheduled at RE #10-12. Therefore, the wireless network node may determine that the canceled portion of the first shared channel does not overlap with the control information, and then the wireless network may perform step 1240.

In step 1240 of FIG. 12, in response to the determination that the canceled portion of the first shared channel during the first time slot does not overlap with at least a portion of the first shared channel during the first time slot scheduled for transmitting the control information, the wireless network node may maintain the portion of the first shared channel during the first time slot scheduled for transmitting the control information. For example (not shown), a cancelled portion of the first shared channel may include RE #3-7, and the control information may be originally scheduled at RE #10-12. Therefore, the wireless network node may maintain the control information at RE #10-12. In another implementation, the wireless network node may recalculate the location for the control information based on a pre-determined protocol.

In step 1250 of FIG. 12, in response to the determination that the canceled portion of the first shared channel during the first time slot overlaps with at least a portion of the first time slot scheduled for transmitting the control information, the wireless network node may recalculate resource for transmitting the control information within a non-canceled portion of the first shared channel during the first time slot, and receiving, by the wireless network node, the control information in the recalculated resource. For example as shown in FIG. 13, the cancelled portion of the first shared channel may include RE #3-7, and the control information may be originally scheduled at RE #7-9. Therefore, the wireless network node may recalculate based on a pre-determined protocol and determine the location for the control information, for example, the wireless network node may determine RE #10-12 for the control information as shown in FIG. 13.

In another implementation, step 1250 may further include determining, by the wireless network node, whether available resource of the first shared channel during the first time slot after the non-canceled portion of the first shared channel during the first time slot is scheduled for transmitting the control information is larger than a per-determined threshold; and in response to the determination that the available resource of the first shared channel during the first time slot after the non-canceled portion of the first shared channel during the first time slot is scheduled for transmitting the control information is larger than the per-determined threshold, scheduling, by the wireless network node, the available resource of the first shared channel during the first time slot for transmitting at least a portion of the first set of information. After the control information uses a portion of the non-cancelled portion 1317 of the first shared channel, available resource of the first shared channel is larger than a pre-determined threshold, or the code rate for transmitting the first set of information in available resource is smaller than a pre-determined threshold, then the wireless network node may schedule the available resource for transmitting a portion of the first set of information or other information. For example as shown in FIG. 13, the available resource may include RE #1-2, RE #8-9, and RE #13-14. For one example, the pre-determined threshold of code rate may be 2. The wireless network node may calculate the code rate for transmitting the first set of information in available resource, if the code rate is smaller than the pre-determined threshold and schedule the available resource for transmitting information. Otherwise, if the code rate is larger than the pre-determined threshold and the available resource may not be used for transmitting information.

The present disclosure describes methods, apparatus, and computer-readable medium for scheduling transmission of control information. The present disclosure addressed the issues with a scheduling conflict related to a shared channel, which is scheduled for transmitting the control information. The methods, devices, and computer-readable medium described in the present disclosure may facilitate the transmission of the control information, so that the effect from cancellation or re-schedule of the shared channel upon the transmission of the control information is greatly reduced. The methods, devices, and computer-readable medium described in the present disclosure may also reduce the un-necessary re-transmission of the shared channel due to the scheduling of the control information. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
receiving, by a wireless network node, a first scheduling request for a radio channel to transmit a first set of information;
scheduling, by the wireless network node, a first radio channel during a first time slot as a first shared channel for transmitting the first set of information in response to the first scheduling request, the first shared channel being shared by control information and the first set of information;

detecting, by the wireless network node, a conflict related to the first shared channel due to a cancellation of the first shared channel due to a constraint of power of a user equipment (UE), or a scheduling conflict between the first shared channel and a scheduled transmission of a second UE; and resolving, by the wireless network node, the conflict related to the first shared channel by:
  canceling, by the wireless network node, the first shared channel scheduled for the first scheduling request, and
  scheduling, by the wireless network node, a second radio channel at a second time slot as a second shared channel for transmitting the first set of information, wherein the second radio channel is a same radio channel as the first radio channel.

2. The method according to claim 1, wherein:
the control information comprises uplink control information (UCI);
the first shared channel comprises a physical uplink shared channel (PUSCH); and
the method further comprises detecting, by the wireless network node, a time domain overlapping between the PUSCH and a physical uplink control channel (PUCCH).

3. The method according to claim 1, wherein, the resolving the conflict related to the first shared channel further comprises:
  determining, by the wireless network node, whether a control channel during the first time slot is available for transmitting the control information; and
  in response to the determination that the control channel during the first time slot is available for transmitting the control information, receiving, by the wireless network node, the control information in the control channel during the first time slot.

4. The method according to claim 1, wherein, the resolving the conflict related to the first shared channel further comprises:
  receiving, by the wireless network node, the control information in the first radio channel during the first time slot.

5. The method according to claim 1, wherein:
a portion of the first shared channel during the first time slot for transmitting the control information is determined based on a pre-defined protocol.

6. An apparatus for wireless communication, comprising:
a memory storing instructions; and
a processing circuitry in communication with the memory, wherein, when the processing circuitry executes the instructions, the processing circuitry is configured to carry out the method of claim 1.

7. A non-transitory computer-readable medium comprising instructions which, when executed by a computer, cause the computer to carry out the method of claim 1.

8. A method for wireless communication, comprising:
sending, by a user equipment (UE), a first scheduling request to a wireless network node, wherein the first scheduling request comprises a request for a radio channel to transmit a first set of information;

receiving, by the UE, a scheduling information comprising a first radio channel during a first time slot as a first shared channel for transmitting the first set of information, the first shared channel being shared by control information and the first set of information; and transmitting, by the UE, the control information in a third radio channel in response to detecting a conflict related to the first shared channel due to a cancellation of the first shared channel due to a constraint of power of the UE, or a scheduling conflict between the first shared channel and a scheduled transmission of a second UE, wherein, transmitting the control information in the third radio channel comprises:
  canceling the first shared channel scheduled for the first scheduling request, and
  transmitting the first set of information in a second radio channel at a second time slot as a second shared channel,
  wherein the second radio channel is a same radio channel as the first radio channel.

9. The method according to claim 8, wherein:
the control information comprises uplink control information (UCI);
the first shared channel comprises a physical uplink shared channel (PUSCH); and
the method further comprises that the wireless network node is adapted to carry out detecting a time domain overlapping between the PUSCH and a physical uplink control channel (PUCCH).

10. The method according to claim 8, wherein, transmitting the control information in the third radio channel in response to detecting the conflict related to the first shared channel further comprises:
  determining whether a control channel during the first time slot is available for transmitting the control information; and
  in response to the determination that the control channel during the first time slot is available for transmitting the control information, transmitting the control information in the control channel during the first time slot.

11. The method according to claim 8, wherein, transmitting the control information in the third radio channel in response to detecting the conflict related to the first shared channel further comprises:
  transmitting the control information in the first radio channel during the first time slot.

12. The method according to claim 8, wherein:
a portion of the first shared channel during the first time slot for transmitting the control information is determined based on a pre-defined protocol.

13. A device for wireless communication, comprising:
a memory storing instructions; and
a processing circuitry in communication with the memory, wherein, when the processing circuitry executes the instructions, the processing circuitry is configured to carry out the method of claim 8.

14. A non-transitory computer-readable medium comprising instructions which, when executed by a computer, cause the computer to carry out the method of claim 8.

* * * * *